United States Patent Office 2,800,594
Patented July 23, 1957

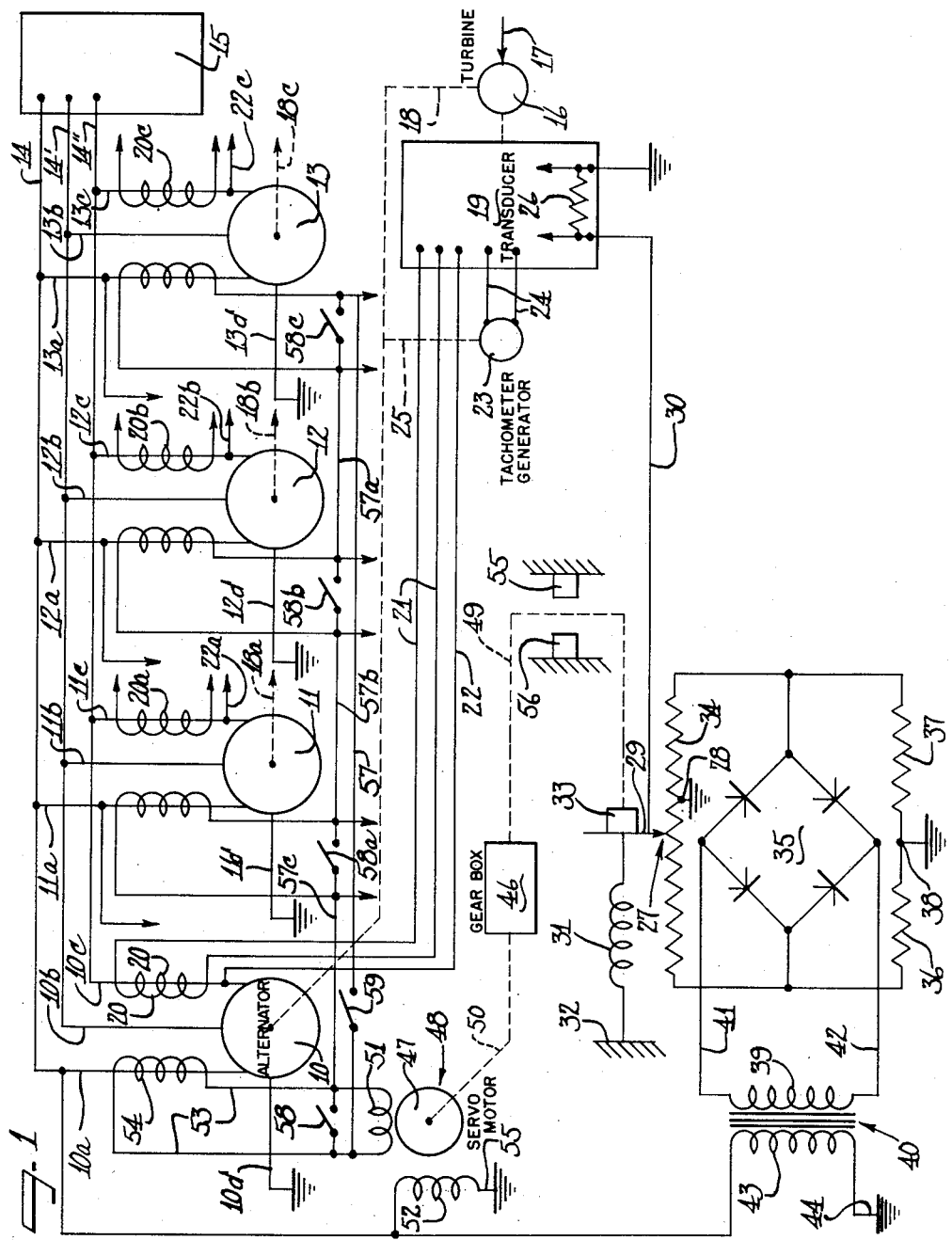

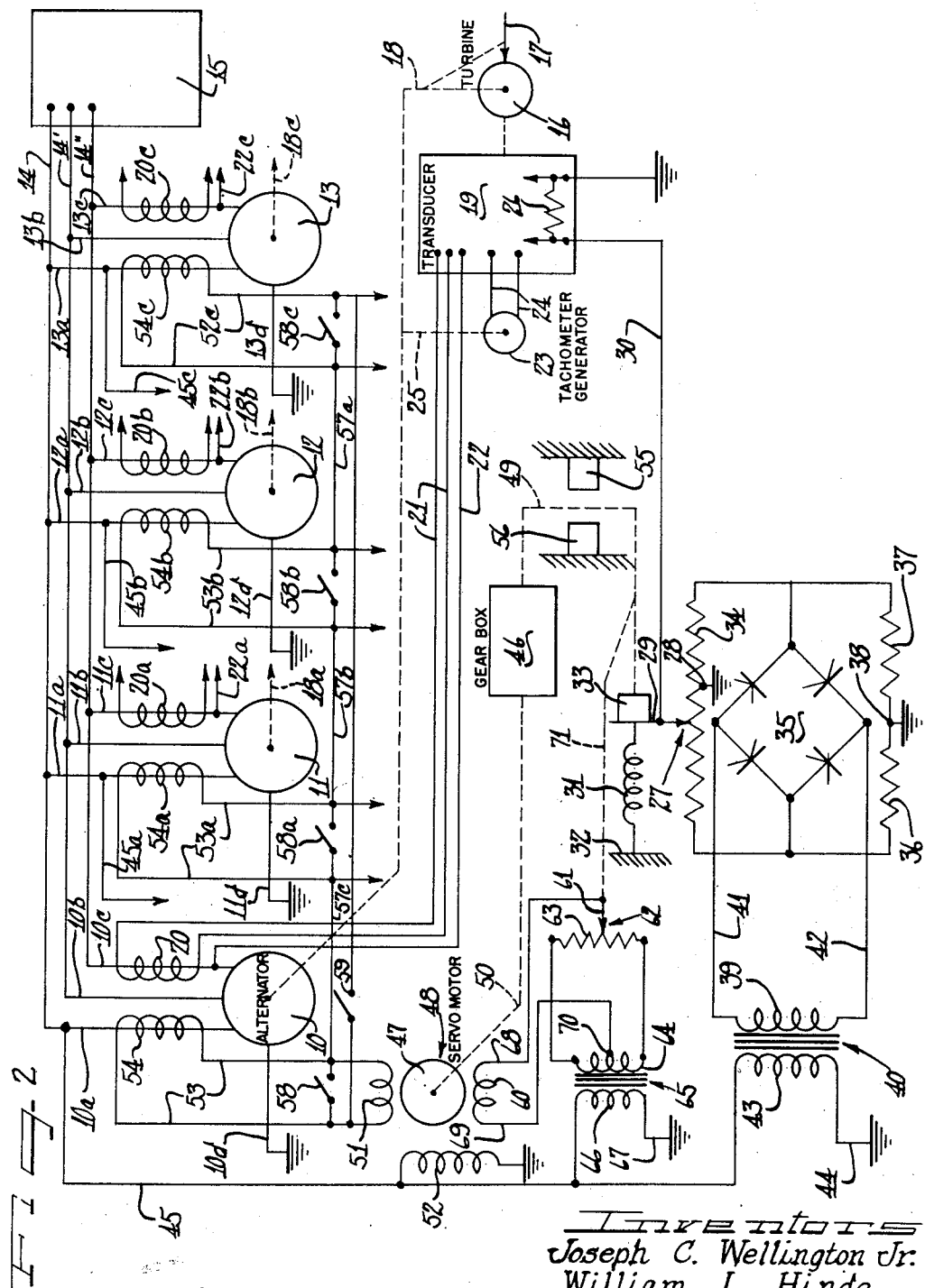

2,800,594

ALTERNATOR CONTROL

Joseph C. Wellington, Jr., and William L. Hinde, Euclid, and Stephen H. Fairweather, South Euclid, Ohio, assignors to Thompson Products, Inc., Cleveland, Ohio, a corporation of Ohio Application July 20, 1954, Serial No. 444,508

14 Claims. (Cl. 307—57)

The present invention relates to an alternator control and more particularly to a control system for alternators to compensate the speed and power input to the alternators in accordance with loads placed on the alternators.

Still more particularly, the present invention is related to and is supplemental to the alternator control system of United States application for patent, Serial No. 382,582, filed September 28, 1953, by Walter R. Chapman and Stephen H. Fairweather, entitled "Control System for Turbine Driven Alternators."

One of the important and distinctive features of the present invention is that it provides means for increasing the speed of response of the control system to more quickly increase and/or decrease the input speed and power to an alternator when the load is increased and/or decreased respectively. In addition, the alternator control system of the present invention is operable to effect improved load division between parallel connected alternators and to effect load division trim control when the alternators are parallel connected and supplying electrical energy to a load.

The control system of the hereinabove identified application for patent by Walter R. Chapman and Stephen H. Fairweather is a control system for each individual alternator to sense the load on each alternator and the output frequency thereof to provide signals to a transducer system which controls the air supply to a pneumatically driven turbine which is connected to the alternator through a gear box. The transducer itself, which is fully described in great detail in the aforesaid application, includes an alternator load-sensing network and a frequency discriminator network which provide control signals in the transducer. By proper obedience to the principles set out in the said application, the alternator will be provided with a manufactured and controlled droop characteristic which will confine the frequency variations of the alternator to within predetermined limits over a full power range of the alternator. So long as the control systems for various parallel connected alternators are substantially matched and so long as the alternators themselves are substantially matched, parallel connection of the alternators with these control systems will permit operation thereof with substantially accurate load division therebetween since the alternators will follow the pre-established droop characteristics.

The transducers are also provided with external control means for manually increasing or decreasing the speed of the alternators so that the speed may be decreased or "depressed" when it is to be connected in parallel with a loaded alternator and is to assume some of the load thereof.

In accordance with the principles of the present invention, an additional signal may be provided to the transducer through the "speed depress" network or some other appropriate network of the transducer, to increase the speed of response of the control system to load variations. This supplementary signal will, of course, be itself responsive to load variations on the alternators. In order that the minimum amount of additional parts and elements may be used, the supplementary control signal fed into the transducer may be supplied thereto by controlling the "speed depress" network as will be described in great detail hereinbelow. The use of the minimum number and weight of supplementary elements is a very important factor not only from the point of view of economy but also from a point of view of increasing the "pay load" of an aircraft when the alternator system is used in an airborne installation. Systems embodying the principles of the present invention also are operable to effect load division trim control by interconnection thereof so that the alternator controls for each of the alternators are interconnected. By these means, any variation in load division between the several alternators will effect such energization of the controls to bring the alternators to an operating point of very close load division therebetween.

Still another feature of the present invention lies in providing the supplemental control with a zero seeking feature which will be operative to reduce the supplemental signal to a null point upon compensation of the alternator input speed and power for variations in the load on the alternator.

These and other objects, principles and advantages of the present invention will become readily apparent from the following detailed description of the present invention and embodiments thereof, from the claims, and from the accompanying drawings in which each and every detail shown is fully and completely disclosed as a part of this specification, and which like reference numerals refer to like parts, and in which:

Figure 1 is a schematic illustration of an alternator control system embodying the principles of the present invention; and Figure 2 is a schematic illustration of a system such as that schematically illustrated in Figure 1 but further including "zero-seeking" means in the supplemental control.

In electrical power installations, for purposes of economy and efficiency, it is usually desirable to have a plurality of sources of power which may be connected together in parallel so that under light load conditions one or two of the sources may be connected together in parallel while under heavier loading conditions, three or four or more such sources of electrical power may be connected together in parallel.

When connecting alternators in parallel, however, it is very important that they be in phase and carry substantially equal portions of the load since operating conditions which are otherwise will result in a continued increase of the load of the more heavily loaded alternator and a continued decrease in the load of the more lightly loaded alternator to a point where the more lightly loaded alternator is run as a motor and the more heavily loaded alternator is overloaded to a point where it may "burn up." Therefore, various means have been devised to control alternators operating in parallel. One of the most important developements along this line is set forth in the above identified application by Walter R. Chapman and Stephen H. Fairweather for controlling alternators in such an installation as, for example, in an aircraft.

In such an installation, there are frequently four alternators such as the alternators 10, 11, 12 and 13 of Figures 1 and 2. Any number of these alternators may be connected in parallel as through busses 14, 14' and 14" to the aircraft electrical system illustrated diagrammatically by the block load 15. The busses 14, 14' and 14" are connected to the alternators, through switches or circuit breakers or various connection and disconnection and protective means (not shown) through alternator leads 10a, 10b, 10c, 11a—13c.

In an aircraft electrical system, one means of driving the alternators 10, 11, 12 and 13 may be by coupling the same to pneumatic turbines through gear boxes or the like diagrammatically indicated at 16 for the alternator 10 which would be supplied with air power as indicated by the arrow 17. The pneumatic turbine and gear box are coupled to the alternator 10 as indicated by the broken mechanical coupling line 18 to drive the alternator.

It should be noted here that for the purposes of simplicity, the controls and drive for only the alternator 10 have been illustrated. The controls and drive means for the alternators 11, 12 and 13 will be substantially identical to those provided for the alternator 10 and the various alternators will be driven through means connected to the coupling lines 18a, 18b and 18c respectively.

The air turbine 16 and the pneumatic energy supplied thereto are preferably controlled by such control means and such transducer means as described in the above identified application for patent by Walter R. Chapman and Stephen H. Fairweather for controlling the input power and speed to the alternator 10. The transducer, which is diagrammatically illustrated by the block 19 is fed with a power-sensing signal including a current-sensing signal from current-sensing means such as a current transformer 20 fed to the transducer over leads 21—21 and a potential signal fed to the transducer over a lead 22 connected to the alternator lead 10c. Each of the other alternators are also provided with load-sensing or power-sensing means including the current transformers 20a, 20b and 20c respectively, and potential leads 22a, 22b and 22c respectively for providing power signals for the individual alternators to their individual transducers.

The transducer 19, as well as the transducers for the other alternators are also provided with a signal having a frequency equal to the frequency of the output of the individual alternators and thereby indicative of the speed of the alternators respectively. Such a signal might be provided by means such as a tachometer generator 23 connected to the transducer by leads 24—24 and mechanically coupled to the alternator 10 and/or the pneumatic turbine and gear box 16, as indicated by the broken mechanical coupling line 25.

When connecting another alternator onto a loaded line so that that alternator may take on some of the load, as described hereinabove, it is important to decrease the speed of the alternator to the speed at which the loaded alternators or alternator are running. This is accomplished by feeding into the transducer and control system and network 19 a signal from a "speed depress" network. In the illustration of this specification, such a speed depress signal is fed to one end of a resistor 26, in the transducer, the other end of the resistor being connected to ground and/or other parts of the transducer and control network. The speed depress signal is applied to the resistor 26 from such means as a rheostat 27 having a potential supplied thereacross and which may be center tapped as at 28 to ground. The signal provided to the transducer and control network 19 is taken from the movable arm 29 of the rheostat 27, the arm 29 being connected to the resistor 26 by a lead 30. Biasing means such as a spring 31 or the like backed up by a fixed point 32 biases the rheostat arm 29 against a stop 33 which is adjustable as hereinafter described in detail.

Thus, movement of the rheostat arm 29 in a direction against the force of the biasing spring 31 will provide a signal to the resistor 26 and the transducer control network 19 over the lead 30 which will be effective to reduce the speed of the alternator by controlling the input speed and power thereto and to the pneumatic turbine and gear box 16.

Control of the position of the stop 33 against which the rheostat arm 29 is biased will also control and determine the magnitude and direction of a supplementary signal supplied to the transducer and control network over the lead 30 for effecting an increased response rate for load variations on the alternators and for effecting load division trim control therebetween.

The source of the supplementary signal potential across the impedance or resistance portion 34 of the rheostat 27 provides a unidirectional potential and current to the rheostat 34. Such a unidirectional source may be a full wave rectifier bridge network 35 connected across the rheostat 27 in parallel with a voltage divider network including series resistors 36 and 37 which are connected to ground at the junction therebetween as at 38. The other two terminals of the full wave rectifier bridge 35 are connected across the secondary 39 of a transformer 40 through leads 41 and 42. The primary 43 of the transformer 40 may have one end thereof connected to ground, as at 44 and the other end thereof connected to the lead 10a of the alternator 10 through a lead 45, the alternators 10, 11, 12 and 13 having grounded neutrals as indicated at 10d, 11d, 12d and 13d.

If the magnitude and the direction of the supplementary signal into the transducer control network 19 over the lead 30 are dependent upon the magnitude and direction of changes in the load on the alternator or alternators, then the supplementary signal will so further energize the transducer and control network at times of load variation as to increase speed of response and increase the rate of controlling the input speed and power to the alternator or alternators. Such control of the supplementary signal is effected by automatically controlling the position of the stop 33 against which the arm 29 of the rheostat 27 is biased, by controlling the position of the stop in accordance with signals from a supplementary load-sensing means.

In the embodiment of the invention illustrated in the drawings, the position of the stop 33 is controlled by mechanically coupling the same through a gear box 46 or the like to the rotor 47 of a servo-motor indicated generally at 48; the servo-motor being energized by means so coupled and connected to the alternator as to provide a signal thereto proportional to the load on the alternator 10. That is, the position of the stop 33 is controlled by coupling the stop 33 to the output of a gear box 46, as indicated by the broken mechanical coupling line 49, and coupling the input of the gear box to the rotor output of the servo-motor 48 as indicated by the broken mechanical coupling line 50. The angular position of the rotor 47 of the servo-motor 48 is determined by the energization of the windings 51 and 52 thereof which provide a power or load-sensing signal to the servo-motor, the winding 51 being connected through leads 53—53 to the output of a current transformer 54 which senses a current in the lead 10a, and the winding 52 being connected between ground as at 55 and the potential-sensing lead 45 connected to the lead 10a.

Thus, with a current signal on the winding 51 and a potential signal on the winding 52 of the servo-motor 48, said signals being indicative of the power from the alternator 10, the rotor 47 will operate through the gear box 46 to adjust the position of the stop 33 thereby moving the biased arm 29 of the rheostat 27 to provide to the transducer control network 19 a supplementary control signal which will be operative to increase the speed of response of the transducer control network thereby more quickly controlling the alternator 10 so that it will not take any greater or lesser portion of the load than its equal share thereof when the same is paralleled with other alternators. Adjusted stops 55 and 56 will be operative to limit angular displacement of the rotor 47 and longitudinal displacement of the adjusted stop 33.

In addition to increasing the speed of response of the transducer control network 19, the supplementary signal supplied thereto over the lead 30 assists in more positively and accurately controlling the input speed and power to the alternator 10.

Each of the other alternators 11, 12 and 13 are provided with substantially identical supplementary control networks for controlling the same in accordance with the loads thereon respectively as indicated by the current-sensing windings 54a, 54b and 54c from which a current-sensing signal is taken over leads 53a, 53b and 53c, and potential-sensing leads 45a, 45b and 45c respectively connected to the alternator leads 11a, 12a and 13a.

With proper and efficient alternator control for each of the alternators, the load on the bus lines will be substantially equally divided between the several alternators. Various transient and internal errors are possible, however, and these may cause unbalances which may be of sufficient magnitude to become detrimental to the operation of the system and cause unequal load division between the alternators.

To prevent any such unbalances, the present invention provides for load division trim control by interconnecting the supplementary current-sensing units whereby unbalances therebetween will effect the generation of appropriate trim signals to the various servo-motors. Exemplary of such an interconnection, the leads 53, 53a, 53b and 53c are series interconnected by leads 57, 57a, 57b, and 57c. That is, the lead 57 extends between one of the leads 53 and one of the leads 53c, while the lead 57a extends between the other of the leads 53c and one of the leads 53b, the lead 57b extending between the other of the leads 53b and one of the leads 53a and the lead 57c extends between the other of the leads 53a and the other of the leads 53. When all four alternators are operating, this interconnection between the supplementary control systems will so tie the systems together as to effect load division trim control therefor.

When any one of the alternators is taken off the line, the supplementary current-sensing unit thereon may be taken out of the trim control interconnection by circuit breaker or switch means indicated at 58, 58a, 58b and 58c respectively connected across the current transformers 54, 54a, 54b and 54c. In addition, switch means such as the switch 59 in the lead or line 57 will permit utilization as a control system for alternator control when but a single alternator is supplying all of the power to the load 15.

Another feature of the present invention is embodied in the schematic illustration of Figure 2 wherein the supplementary control servo-motor 48 has a second control winding 60 which is phased with the first control winding or current-sensing winding 51, as distinct from being phased with the reference winding or potential-sensing winding 52. The signal supplied to the winding 60 is taken from the movable arm 61 of a rheostat 62, the resistance 63 of which is connected across the secondary 64 of a transformer 65 having a primary 66, one end of which is grounded as at 67 and the other end of which is connected to the potential lead 45. That is, one end 68 of the second control winding is connected to the movable arm 61 of the rheostat 62, and the other end 69 of the control winding 60 is connected to a center tap 70 on the secondary 64 of the transformer 65.

The signal on the second control winding 60 will therefore be such as to return the servo-motor rotor 47 through a zero or center neutral position after changes in the load on the alternator have been compensated for through the control of the alternator by the transducer and control system 19. The magnitude of the signal on the second control winding 60 is controlled by controlling the position of the contact arm 61 in accordance with the angular position and dispacement of the rotor 47 by mechanically coupling the arm to the output of the gear box 46 as indicated by the broken mechanical coupling line 71. This self-centering or neutralizing feature is operative as a zero-seeking operation for the supplementary control system.

It will be observed that numerous variations and modifications of the present invention may be made without departing from the true spirit and scope of the novel concepts and principles of our invention. We, therefore, intend to cover all such modifications and variations as fall within the true spirit and scope of the novel concepts and principles of our invention.

We claim as our invention:

1. In an alternator control system to control input speed and power thereto in accordance with the load thereon, a transducer control system, means to provide alternator operating condition signals to the transducer, said transducer being coupled to the alternator to control input speed and power thereto in accordance with the signals from said means, and supplementary signal means responsive to operating conditions of the alternator to provide a supplementary signal to the transducer to increase the speed and accuracy of response of the transducer.

2. In an alternator control system to control input speed and power thereto in accordance with the load thereon, a transducer control system, means to provide alternator operating condition signals to the transducer, said transducer being coupled to the alternator to control input speed and power thereto in accordance with the signals from said means, supplementary signal means connected to said transducer, and supplementary alternator load-sensing means energizing further means to control the magnitude and direction of the output of the supplementary signal means to increase the speed and accuracy of response of the transducer.

3. In an alternator control system to control input speed and power thereto in accordance with the load thereon, a transducer control system, means to provide alternator operating condition signals to the transducer, said transducer being coupled to the alternator to control input speed and power thereto in accordance with the signals from said means, supplementary signal means connected to said transducer, a servo-motor having a reference winding, a control winding and a rotor, and supplementary alternator load-sensing means connected to the windings of the servo-motor, said rotor being angularly displaceable in accordance with the energization of the windings and coupled to the supplementary signal means to control the magnitude and direction of the output thereof to increase the speed and accuracy of response of the transducer.

4. In an alternator control system wherein alternators to be connected in parallel and to have the load thereon to be divided substantially equally between them are each provided with input speed and power control means, the improvement comprising a supplementary signal source connected to the control means for each of the alternators, and supplementary load-sensing means coupled to the signal source for each of the alternators to control the signal input to the control means from said signal source whereby alternator speed and power input is controlled and varied at an increased rate.

5. In an alternator control system wherein alternators to be connected in parallel and to have the load thereon to be divided substantially equally between them are each provided with input speed and power control means, the improvement comprising a supplementary signal source connected to the control means for each of the alternators, and supplementary load-sensing means coupled to the signal source for each of the alternators to control the signal input to the control means from said signal source whereby alternator speed and power input is controlled and varied at an increased rate, the supplementary load-sensing means being connected together whereby load division trim control is effected.

6. In an alternator control system wherein alternators to be connected in parallel and to have the load thereon to be divided substantially equally between them are each provided with input speed and power control means, the improvement comprising a supplementary signal source connected to the control means for each of the alternators, and supplementary load-sensing means coupled to the signal source for each of the alternators to control the signal input to the control means from said signal source whereby alternator speed and power input is controlled and varied at an increased rate, the supplementary load-sensing means being connected in series whereby load division trim control is effected.

7. In an alternator control system wherein alternators to be connected in parallel and to have the load thereon to be divided substantially equally between them are each provided with input speed and power control means, the improvement comprising a supplementary signal source connected to the control means for each of the alternators, and supplementary alternator operating condition sensing means for each of the alternators connected to further means to energize the same in accordance with those conditions to control the output of the supplementary signal source, and means connecting the supplementary signal source to the control means whereby alternator speed and power input is controlled and varied at an increased rate.

8. In an alternator control system wherein alternators to be connected in parallel and to have the load thereon to be divided substantially equally between them are each provided with input speed and power control means, the improvement comprising a supplementary signal source connected to the control means for each of the alternators, and supplementary alternator operating condition sensing means for each of the alternators connected to further means to energize the same in accordance with those conditions to control the output of the supplementary signal source, and means connecting the supplementary signal source to the control means whereby alternator speed and power input is controlled and varied at an increased rate, said supplementary sensing means being connected together whereby variation between the outputs thereof will operate to effect load division trim control between the alternators.

9. In an alternator control system wherein alternators to be connected in parallel and to have the load thereon to be divided substantially equally between them are each provided with input speed and power control means, the improvement comprising a supplementary signal source connected to the control means for each of the alternators, and supplementary alternator operating condition sensing means for each of the alternators connected to further means to energize the same in accordance with those conditions to control the output of the supplementary signal source, and means connecting the supplementary signal source to the control means whereby alternator speed and power input is controlled and varied at an increased rate, said supplementary sensing means being connected together in series whereby variation between the outputs thereof will operate to effect load division trim control between the alternators.

10. In a system to control load division between parallel connected alternators whereby isochronous operation of the alternator may be maintained, means to sense the load on each of the alternators, transducer means to control the speed and power input to each of the alternators, means providing an actuating signal to said transducer means, servo means responsive to a signal from each of the sensing means respectively to control the actuating signal means.

11. In a system to control load division between parallel connected alternators whereby isochronous operation of the alternator may be maintained, means to sense the load on each of the alternators, transducer means to control the speed and power input to each of the alternators, means providing an actuating signal to said transducer means, servo means responsive to a signal from each of the sensing means respectively to control the actuating signal means, said actuating signal means including manually adjustable elements biased against a stop.

12. In a system to control load division between parallel connected alternators whereby isochronous operation of the alternator may be maintained, means to sense the load on each of the alternators, transducer means to control the speed and power input to each of the alternators, means providing an actuating signal to said transducer means, servo means responsive to a signal from each of the sensing means respectively to control the actuating signal means, said actuating signal means including manually adjustable elements biased against a stop, and said servo means being operably arranged to adjust the position of the stop.

13. In a system to control the speed and power input to an alternator in accordance with the load thereon, a servo-motor in accordance with that load, an electro mechanical transducer to control the speed and power input to the alternator and means connected to the transducer and coupled to the servo-motor to energize the transducer in accordance with energization of the servo-motor to cause the transducer to provide increased speed and power input to the alternator to compensate for an increased load thereon.

14. In an alternator control system to control input speed and power thereto in accordance with the load thereon, a transducer control system means to provide alternator operating condition signals to the transducer, said transducer being coupled to the alternator to control input speed and power thereto in accordance with the signals from said means, supplementary signal means connected to said transducer, a servo-motor having a reference winding, a control winding and a rotor, and supplementary alternator load-sensing means connected to the windings of the servo-motor, said rotor being angularly displaceable in accordance with the energization of the windings and coupled to the supplementary signal means to control the magnitude and direction of the output thereof to increase the speed and accuracy of response of the transducer, a second control winding on said servo-motor, and means to energize said second control winding coupled to said motor to energize the second control winding in accordance with angular displacement of the rotor whereby the servo-motor is zero-seeking.

References Cited in the file of this patent
UNITED STATES PATENTS

| | | |
|---|---|---|
| 2,057,490 | Jenks | Oct. 13, 1936 |
| 2,448,442 | Kirschbaum | Aug. 31, 1948 |
| 2,501,340 | Kresser | Mar. 21, 1950 |
| 2,636,132 | Stineman et al. | Apr. 21, 1952 |